Dec. 29, 1953  F. N. GILLETTE  2,664,470
UNIVERSAL FOCUS SOUND SCANNING SYSTEM
Filed May 15, 1952  2 Sheets-Sheet 1

INVENTOR.
FRANK N. GILLETTE
BY
ATTORNEY.

Dec. 29, 1953        F. N. GILLETTE        2,664,470
UNIVERSAL FOCUS SOUND SCANNING SYSTEM
Filed May 15, 1952        2 Sheets-Sheet 2
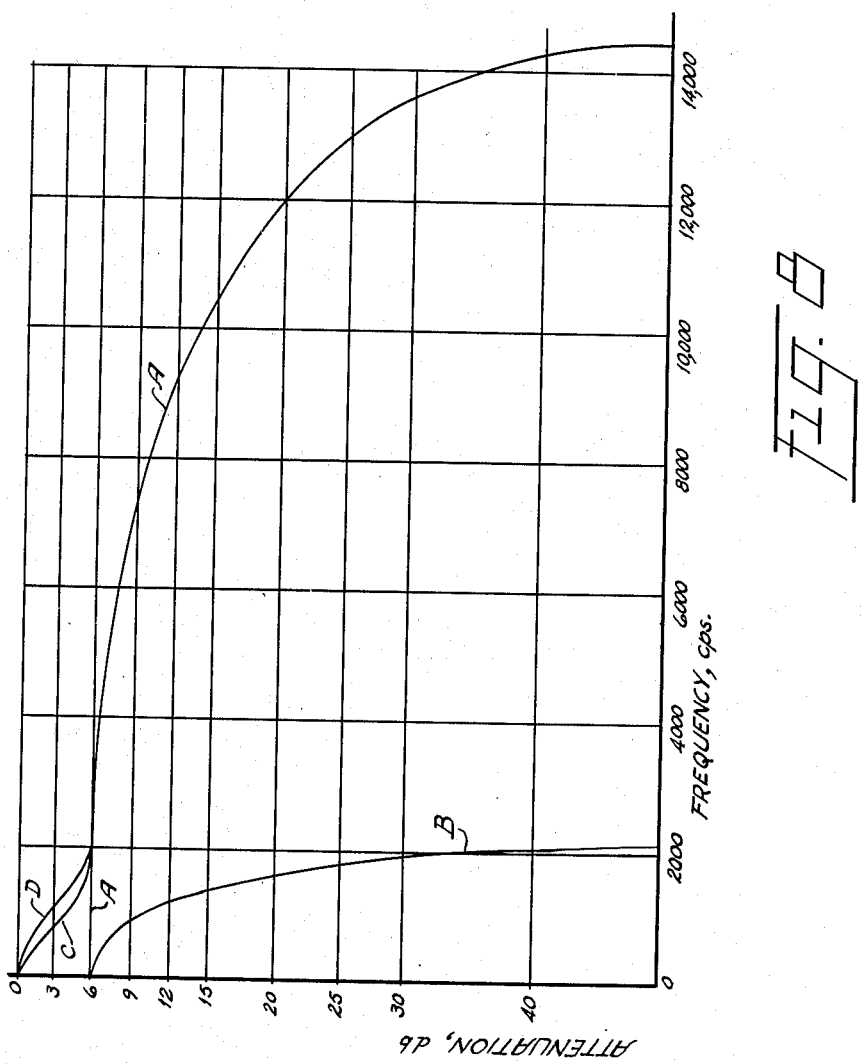
INVENTOR.
FRANK N. GILLETTE
BY
ATTORNEY Patented Dec. 29, 1953

2,664,470

UNITED STATES PATENT OFFICE 2,664,470

UNIVERSAL FOCUS SOUND SCANNING SYSTEM

Frank N. Gillette, Pleasantville, N. Y., assignor to General Precision Laboratory Incorporated, a corporation of New York Application May 15, 1952, Serial No. 288,079

5 Claims. (Cl. 179—100.31)

This invention pertains to systems for reproducing sound modulations which have been photographically recorded on film strips and more particularly to a system which requires no manipulation or adjustment to faithfully reproduce the recorded sound regardless of the relative surface orientation of the film with respect to the system.

In reproducing sound recorded film in the projection of motion picture sound film and the like, a narrow band of film near one edge is utilized as the sound track, the sound vibrations having been recorded thereon either as a variable density or as a variable width track. In order to secure reasonable efficiency of reproduction of the higher sound frequencies the light of an exciter lamp is projected through a narrow slit, the illuminated image of which is sharply focused on the film sound track. The permitted error in focus is in fact, much less than the film thickness of .006 inch.

A phototube positioned on the side of the film strip opposite to that occupied by the exciter lamp, scanning slit and associated optical equipment converts the variable amount of light transmitted through the film strip to proportional electrical variations which in turn are converted to sound variations in a well-known manner.

In projecting 16 mm. film incorporating a sound track, there is at present no standard as respects the position of the emulsion surface of the film. That is to say, the emulsion surface may be positioned either toward or away from the phototube. For present purposes a film which at the sound drum has its emulsion toward the phototube will be termed of the front-surface type, while film whose emulsion surface faces away from the phototube will be termed of the rear-surface type. Since both types of 16 mm. film are in existence, it is necessary in general for a 16 mm. projector to be designed to handle either type of film, and in order to do this the projector must be capable of focusing the light image of the scanning slit on either surface of the film. Ordinarily when changing from one type of film to the other the refocusing of the scanning slit image must be accomplished by a readjustment of the scanning optics or other similar manually manipulative procedure.

The present invention eliminates this manual operation by providing an optical system that simultaneously has two foci, focusing the image of the scanning slit with the requisite sharpness on both surfaces of film at one and the same time. The operator of the projector therefore need make no adjustment in changing from front-surface film to rear-surface film and, indeed, it is not necessary for him to know which type of film he is using. In utilizing the present invention the sound recordings on both types of film are reproduced equally well, the quality of reproduction being equal to that of present sound reproducing systems requiring adjustment.

The principal object then of this invention, is to provide a motion picture projector requiring no adjustment or change to reproduce recorded sound from either front-surface or rear-surface film.

More generally, an object of this invention is to provide a device for the automatic reproduction of sound from front-surface film or rear-surface film with equal quality.

A further understanding of this invention may be secured from the detailed description and accompanying drawings, in which.

Figure 5:
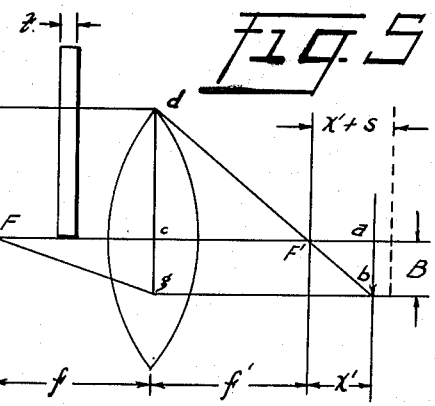

Figure 5 schematically depicts a representative optical system.

Figure 6:
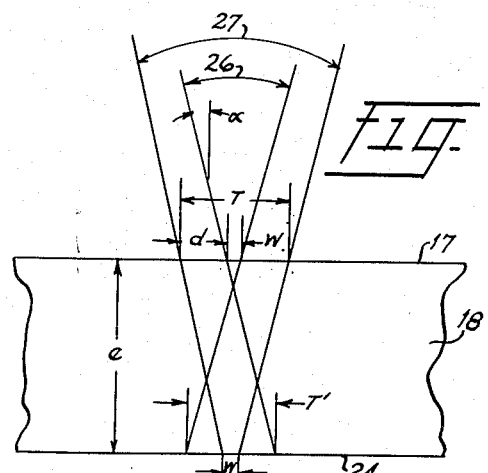
Figure 7:
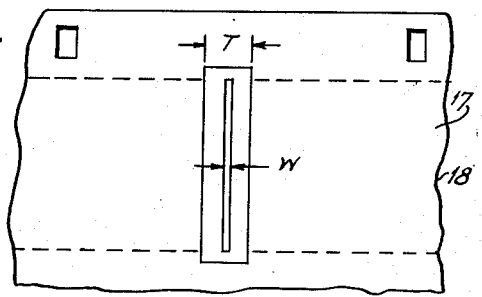

Figures 6 and 7 are enlarged edge and plan views respectively, of an illuminated film sound track.

Figure 8 depicts characteristic loss-frequency curves of the sound scanning system of the invention.

The well-known "stereopticon" type of sound reproduction optical system is chosen for illustration of the principle of this invention, although application is not restricted to this type but includes the "motion picture" optical type, the cylindrical type, and all other types of system for scanning a sound record on film by a focused beam of light.

Figure 1:
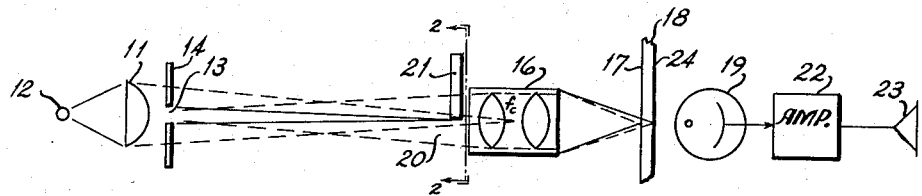
Figure 1 is a diagrammatic illustration of an optical system employing this invention.

Referring now to Fig. 1, a condenser lens 11 focuses the light of a coiled lamp filament 12 at a point $f_c$. A scanning slit 13 is formed by providing an aperture in an opaque sheet 14, the slit being .002 inch wide and 0.288 long. The slit 13 is positioned so that its center coincides with the optical axis of the system and is located between the condenser lens 11 and an objective lens 16. The objective lens 16 is designed and positioned so as to have its normal conjugate foci at the slit 13 and at the near or rear surface 17 of 16 mm. film 18. A phototube 19 is placed on the other side of film 18 in position to be actuated by light transmitted through the film.

Figure 2:
Figure 2 is a view of certain optical details looking in the direction of line 2—2 of Fig. 1.

Additionally a transparent optical glass plate 21 is positioned closely adjacent the objective lens 16 between the lens 16 and the slit 13 with one edge thereof coinciding with the optical axis of the system. Such an arrangement, as illustrated in Figs. 1 and 2, results in the interception of one-half of the cone of illumination 20 by the optical plate 21 while permitting the other half thereof to be transmitted unimpeded towards the film strip 18. The positioning of the plate 21 distant from either focal point causes it to have equal effect upon all rays of light arriving at the receiving focal point. In this respect the glass plate can be placed equally well upon either side of the objective lens 16, but its position on the light source side is preferable because it results in a thicker and more convenient glass thickness.

When light is transmitted from lamp 12 through lenses 11 and 16, and the optical plate 21 is removed, an image of the slit 13 is projected on and sharply focused on the rear side 17 of the film 18, the optical dimensions being such as to reduce the slit image dimensions at the film width of .0005 inch and a length of .072 inch transverse to the film. As the film moves uniformly past the light beam at the normal rate for 16 mm. film of 7.2 inches per second, the variable density of its sound track modulates the light passing through it, and the modulated light falls on the cathode of the phototube 19. Conventional phototube circuits 22 amplify the modulated phototube current and apply it to the speaker 23.

When an interrupting plate of any kind is interposed in one-half of the converging light beam between the slit 13 and the objective lens 16, the plate being distant from both focal points, its effect is uniform upon all parts of the image as before stated and causes a reduction of the sharply-focused image illumination by one-half. The plate such as 21 has this effect even though transparent because, since its index of refraction is greater than that of air, the focus of those rays intercepted thereby lies at a point more distant than the surface 17.

The exact point at which these intercepted rays are focused depends upon the angle of divergence of the rays at the plate, the index of refraction of the optical glass plate, the plate thickness and if, as here, part of the light extends through the film, the length of this film path and the film's index of refraction. From these data the proper glass thickness is computed to cause the light image transmitted through it to fall on the front surface 24 of the film 18.

Figure 3:
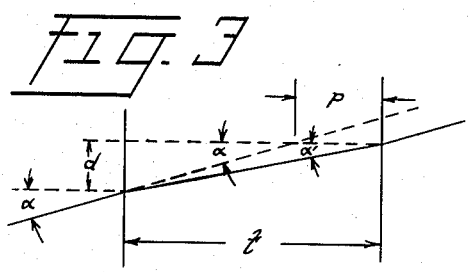
Figures 3 and 4 are diagrammatic illustrations of parts of the optical system of Fig. 3, changed in size and proportion for convenience in analysis.

In Fig. 3 the glass plate 21 and the incident and refracted ray are redrawn to a larger scale. In the index of refraction for this glass is $N$, then $$\frac{\sin \alpha}{\sin \alpha'} = N \quad (1)$$

This definition holds for both convergent and divergent incident light, $\alpha$ and $\alpha'$ being the angles of the incidence and refraction. Also, when the glass thickness is $t$ and the component of longitudinal travel in the glass is $d$, $$\tan \alpha = \frac{d}{t-p} \quad (2)$$

$p$ being the axial refraction.
Also, $$\tan \alpha' = \frac{d}{t} \quad (3)$$

Dividing (3) by (2)

$$\frac{\tan \alpha'}{\tan \alpha} = 1 - \frac{p}{t} \quad (4)$$

or $$1 - \frac{p}{t} = \frac{\sin \alpha' \cos \alpha}{\sin \alpha \cos \alpha'} \quad (5)$$

which reduces to $$p = t\frac{N-1}{N}\frac{\cos \alpha}{\cos \alpha'} \quad (6)$$

At the optical axis $\alpha$ and $\alpha'$ become zero, and in Fig. 1 they are small and nearly equal. Therefore (6) can be simplified to $$p = t\frac{N-1}{N} \quad (7)$$

Figure 4:
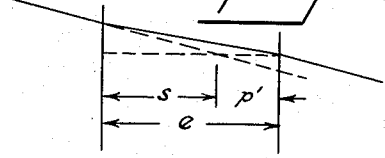

In focusing on the film front surface a similar refraction occurs, as shown in Fig. 4, so that in terms of film thickness $e$ and film index of refraction $n$, the axial refractive shift $p'$ is $$p' = e\frac{n-1}{n} \quad (8)$$

As an example, for film having the standard thickness of .006 inch and the usual index of 1.500, $p' = .002$ inch. If $s$ is the axial shift required of the optical system to shift the focus from the rear surface to the front surface of the film, it is seen from Fig. 4 to equal $$s = e - p' \quad (9)$$

The optical system of Fig. 1 is redrawn schematically in Fig. 5 with the principal foci F and F' indicated at the equal focal distances $f$ and $f'$. For clarity a thin lens having a single principal plane is indicated. The object and image have half-diameters A and B, so that by definition $$\frac{B}{A} = m \quad (10)$$

where $m$ is magnification.
In the triangles $abF'$, $F'cd$, $dgh$ and $hjk$, $$x_1 = \frac{f^2}{x'} \quad (11)$$

$$x' = \frac{f}{m} \quad (12)$$

$$x_2 = \frac{f^2}{x'+s} \quad (13)$$

Also $$p = x_1 - x_2 \quad (14)$$

It is evident that such thickness $t$ of glass 21 is required that when substituted in Equation 7 that value of $p$ results which will in turn cause a shift $s$ of the right-hand focal plane. Accordingly, substituting the values for $x$ and $x_2$ secured from Equations 11 and 13 in Equation 14, $$p = f^2\left[\frac{s}{x'(x'+s)}\right] \quad (15)$$

Substituting for $p$ its value from (7) and solving for $t$, $$t = \frac{N}{N-1}\left[\frac{f^2 s}{x'(x'+s)}\right] \quad (16)$$

From (8) and (9)

$$s = \frac{e}{n} \quad (17)$$

Substituting for $s$ its value and for $x'$ its value from (12) in (16), and clearing, $$t = \frac{N}{N-1} f \left[ \frac{m^2 e}{fn + me} \right] \quad (18)$$

As an example of the use of this equation, employing the optical constants of one well-known projector, the glass thickness is computed to be 0.16 inch.

The images so focused upon the front and rear surfaces are of practically equal brightness, since the glass plate intercepts exactly one-half of the beam. However, this condition is by no means essential to the invention and any desired degree of interception by the glass of the beam may be employed.

Surrounding the sharply focused image on the rear surface 17 of the film there is, of course, a zone of defocused light of lower brightness resulting from the portion of the beam that is focused on the front surface 24. Similarly and for a similar reason, the front surface image is also surrounded by a defocused zone of lower brightness.

In Figs. 6 and 7 the film 18 is illustrated as having a thickness $e$. One sharply focused beam 26 produces a slit image of width $w$ on the rear surface 17, and the other sharply focused beam 27 produces a slit image of similar width $w$ on the front surface 24. If the beam half angle is $a$, the low-light width $d$ on the one side of the rear-surface image is equal to the film thickness multiplied by $\tan a$, or $$d = e \tan a \quad (19)$$

The sum of the zones on the two sides is then $2d$ or $2e \tan a$, and the total width T is $2d + w$ or $$T = w + 2e \tan a \quad (20)$$

In the example given, $T = .0035$ inch.

In any sound scanning system the attenuation of higher frequencies is controlled by the width of the slit image at the film surface, the limiting frequency being that at which one wavelength recorded on the film equals the slit image width. Between this frequency and a frequency of about one-tenth thereof, the output is attenuated in accordance with the equation $$\text{db attenuation} = 20 \log \left[ \frac{\sin\left(\frac{\pi f w}{v}\right)}{\frac{\pi f w}{v}} \right] \quad (21)$$

in which $f$ is the frequency and $v$ is the film velocity. This equation is plotted as curve A of Fig. 8 for standard 16 mm. film speed and a slit image width of .0005 inch.

In accordance with this equation, that half of the light energy which is sharply focused on the rear surface of rear-surface film is modulated in accordance with the variations of the sound track, and passes through the sound track to actuate the phototube. The actuation of the phototube, however, departs from fidelity by reason of the finite width of the slit image, so that the sound track frequencies reproduced in the phototube current suffer the attenuation represented by curve A.

A second curve B depicts attenuation when the slit width is .0035 inch, and represents the frequency characteristic of the defocused light covering the distance T in Fig. 6. Since the total quantity of this defocused light is equal to the total quantity of focused light, the comparable curve B starts at the same point on the db scale as curve A.

Curve C is the sum of curves A and B and represents the total effect on the phototube of both the focused and defocused light modulated by rear-surface or non-standard film. This curve indicates that the use of dual focal planes causes the low frequencies to be emphasized by a maximum of 6 db. This effect, however, is easily neutralized by adding a conventional compensating network to the amplifier 22, Fig. 1. This compensating circuit has a frequency characteristic at frequencies below 2055 cps. that is the inverse of that part of curve C, so that the resulting audio power applied to the speaker has a flat characteristic similar to the lower part of curve A.

The increase of lower frequencies in standard or front surface projection depends on the distance $T'$, Fig. 6, which is slightly less than T, and has the value $$T' = 2e \tan a - w \quad (22)$$

This frequency relationship added to that of curve A is plotted as curve D, and the compensating network is preferably designed as a compromise based on the average of curves C and D.

Thus the interception of substantially half of the light projected through the optical lens system 16 by an optical plate 21 of suitable thickness results in producing a focused scanning slit image at both the front and back surfaces of the film strip so that regardless of the surface on which the sound is recorded faithful reproduction thereof is attained.

What is claimed is:

1. A sound scanning system for reproducing sound modulations photographically recorded on the sound track of a film strip comprising, a scanning slit, means for illuminating said scanning slit, means for focusing an illuminated image of said scanning slit on one surface of said film strip, a transparent plate interposed between said scanning slit and said film strip said transparent plate being positioned so as to intercept a portion only of the light transmitted from said focusing means to said film strip, and means for converting light variations transmitted through said film strip into corresponding electrical variations.

2. A sound scanning system for reproducing sound modulations photographically recorded on the sound track of a film strip comprising, means for focusing a narrow band of light extending across the sound track on the surface of said film strip adjacent said focusing means, a transparent plate positioned to intercept a portion only of the light transmitted by said focusing means, said transparent plate being positioned adjacent said focusing means, and means for converting light variations transmitted through said film strip into to corresponding electrical variations.

3. A sound scanning system for reproducing sound modulations photographically recorded on the sound track of a film strip comprising, a source of illumination, an optical system for converting light derived from said source to a narrow sharply focused band of light impinging on the surface of said film strip adjacent said optical system and extending transversely of said sound track, a transparent plate having a straight edge thereof normal to and coinciding with the axis of said optical system, positioned in the light path of said optical system at a distance from said film strip and means for converting light variations transmitted through said film strip into corresponding electrical variations.

4. A sound scanning system for reproducing sound modulations photographically recorded on the sound track of a film strip comprising, means for focusing a narrow band of light extending across the sound track on the surface of said film strip, means for converting light variations transmitted through said film strip into corresponding electrical variations, and a transparent plate positioned to intercept a portion only of the light transmitted by said focusing means said transparent plate being positioned adjacent said focusing means and having a thickness $t$ expressed by the equation $$t=\frac{N}{N-1}f\left[\frac{m^2e}{fn+me}\right]$$

in which $f$ is the focal length of said focusing means, $N$ and $n$ are the respective indices of optical refraction of said plate and said film, $e$ is the film thickness and $m$ is the magnification of the optical system.

5. A sound scanning system for reproducing sound modulations photographically recorded on the sound track of a film strip comprising, a source of illumination, an optical system for converting light derived from said source to a narrow sharply focused band of light impinging on the surface of said film strip adjacent said optical system and extending transversely of said sound track, a transparent plate having a straight edge thereof normal to and coinciding with the axis of said optical system positioned in the light path of optical system at a distance from said film strip, said transparent plate having a thickness $t$ expressed by the equation $$t=\frac{N}{N-1}f\left[\frac{m^2e}{fn+me}\right]$$

in which $f$ is the focal length of said focusing means, $N$ and $n$ are the respective indices of optical refraction of said plate and said film, $e$ is the film thickness and $m$ is the magnification of the optical system.

FRANK N. GILLETTE.

References Cited in the file of this patent

UNITED STATES PATENTS

| Number | Name | Date |
|---|---|---|
| 2,554,679 | Mitchell | May 29, 1951 |